Aug. 9, 1938.　　　　E. G. MUELLER　　　　2,126,652
SLACK ADJUSTER
Filed June 10, 1937

INVENTOR
Emil G. Mueller.
BY
HIS ATTORNEY

Patented Aug. 9, 1938

2,126,652

UNITED STATES PATENT OFFICE 2,126,652

SLACK ADJUSTER

Emil G. Mueller, Swissvale, Pa., assignor to The American Brake Company, Swissvale, Pa., a corporation of Missouri Application June 10, 1937, Serial No. 147,501

6 Claims. (Cl. 188—197)

My invention relates to slack adjusters, that is, to devices which are interposed between, and cooperate with, two of the members of the brake rigging of a railway vehicle, such for example, as a brake rod and a brake beam, or a brake rod and a brake cylinder lever, for the purpose of taking up slack in the rigging as the brake shoes become worn.

One object of my invention is to provide a simple, efficient, and durable brake slack adjuster which includes means for protecting the threaded members against moisture, dust, dirt, and the like.

I shall describe two forms of slack adjusters embodying my invention, and shall then point out the novel features thereof in the claims.

Figure 1:
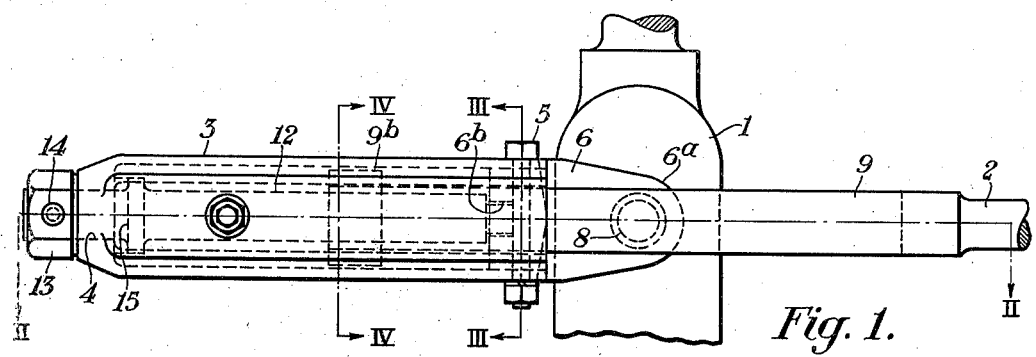
Figure 2:
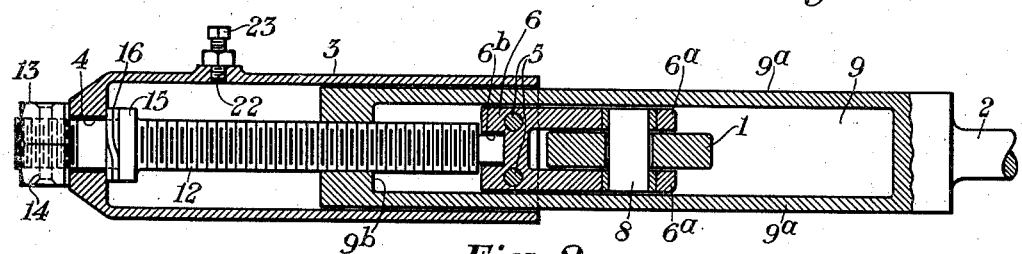
Figure 3:
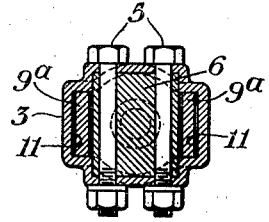
Figure 4:
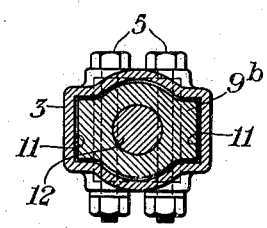
Figure 5:
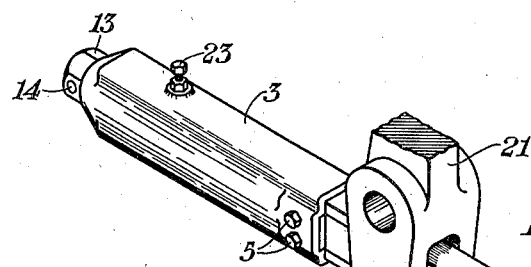
Figure 6:
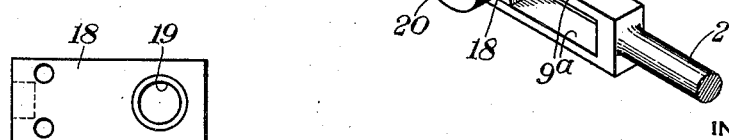

In the accompanying drawing, Fig. 1 is a top plan view illustrating a slack adjuster embodying my invention in connection with a brake beam 1 and a brake rod 2. Figs. 2, 3, and 4 are sectional views taken on the lines II—II, III—III, and IV—IV, respectively, of Fig. 1. Fig. 5 is an isometric view showing, on a reduced scale, a modified form of slack adjuster embodying my invention adapted for use in connection with a brake cylinder lever and a brake rod. Fig. 6 is a side elevational view of the fulcrum block 18 of the modified form of slack adjuster illustrated in Fig. 5.

Similar reference characters refer to similar parts in each of the several views.

Referring first to Figs. 1 to 4, inclusive, a slack adjuster embodying my invention is here illustrated in connection with a brake beam 1 comprising part of the conventional brake rigging of a railway vehicle, and one of the brake rods 2 which actuates the brake beam 1.

The slack adjuster comprises an elongated substantially rectangular housing 3 provided at one end with a bearing 4, and secured at the other end by means of a pair of bolts 5 to a fulcrum block 6. The fulcrum block 6 is formed with spaced lugs 6ª which straddle the brake beam 1 with some clearance, and is pinned to the brake beam 1 by means of a pin 8 disposed in aligned holes formed in the lugs 6ª and in the brake beam.

A frame 9 comprising a pair of spaced arms 9ª joined at one end by an integral nut 9ᵇ, is formed integrally with one end of the rod 2, and the arms of this frame extend into the housing 3 on opposite sides of the fulcrum block 6, and are slidably mounted within the housing in suitable guideways 11 formed in the opposite side walls of the housing. An adjusting screw 12 is journaled adjacent one end in the previously described bearing 4, and at the other end in a bearing 6ᵇ formed in the fulcrum block 6, and this screw cooperates intermediate its ends with the nut 9ᵇ of the frame 9 in such manner that rotation of the screw will move the frame to different longitudinal positions with respect to the housing 3. To facilitate rotation of the screw 12, a portion of the screw is made to extend completely through the bearing 4, and is threaded for the reception of a nut 13 which is locked in place by a pin 14. A shoulder 15 is provided on the screw adjacent the inner end of the bearing 4, and interposed between this shoulder and the bearing is a sinuous thrust washer 16. The washer 16 yieldably resists endwise motion of the screw 12, and also serves as a means for preventing rotation of the screw due to vibration of the parts.

The housing 3 is intended to be filled with a suitable lubricant, and to enable the lubricant to be readily inserted into the housing, the housing is provided with a filler opening 22 which is closed by a removable plug 23.

In assembling the slack adjuster, the screw 12 is first inserted into the bearing 4 in the housing 3 and is secured in place by means of the nut 13. The fulcrum block 6 is next pinned to the brake beam 1, and the frame 9 is then slipped over the end of the brake beam to the position in which the arms 9ª straddle the fulcrum block, after which the housing 3 is slipped onto the end of the frame 9 far enough to permit the screw 12 to be started into the nut 9ᵇ of the frame. The screw 12 is then rotated in a manner to move the frame into the housing until the frame has been moved far enough to permit the housing to receive the adjacent end of the fulcrum block, whereupon the housing is moved to its proper position on the fulcrum block and is bolted in place by means of the bolts 5.

In operation, when the brake rod 2 is moved toward the right, as will be the case when the brakes are being applied, the force exerted on the brake rod will be transmitted to the nut 13 through the screw 12 in tension, and thence through the housing 3, fulcrum block 6, and pin 8 to the brake beam 1. When, however, the brake rod 2 is moved toward the left, as will be the case when the brakes are being released, the force exerted on the pull rod 2 will be transmitted to the housing 3 through the screw 12, shoulder 15, and thrust washer 16 in compression, and thence through the housing 3, fulcrum block 6, and pin 8 to the brake beam 1.

When slack develops in the rigging due to brake shoe or other wear, the required adjustment to take up this slack may be made by rotating the screw 12 in a clockwise direction. This rotation will cause the frame 9 to move farther into the housing 3, and will thus decrease the effective length of the brake rod.

It is sometimes desirable to connect a slack adjuster embodying my invention with some part of the brake rigging other than a brake beam such, for example, as a brake cylinder lever. If this lever is flat at the point where it is to be connected with the slack adjuster, the connection may be effected in the same manner that the connection is effected between the slack adjuster and the brake beam 1 in Fig. 1. When, however, the lever is bifurcated or slotted at the point where it is to be connected with the slack adjuster, it is then necessary to replace the fulcrum block 6 by a different type of fulcrum block which may, for example, be similar to the fulcrum block 18 shown in Fig. 6. Referring to Figs. 5 and 6, it will be seen that the only difference between the fulcrum block 18 and the fulcrum block 6 is that the fulcrum block 18, instead of being provided with spaced lugs which form a jaw, is provided adjacent its outer end with a transversely extending bushed hole 19 which receives a pin 20 carried by the bifurcations or spaced sides of the lever 21. The operation of the slack adjuster, when modified in the manner shown in Fig. 5, is similar to that previously described, and will therefore be apparent from the foregoing description without further detailed description.

It should be particularly pointed out that with a slack adjuster constructed in accordance with my invention, the threaded portion of the adjusting screw 12, as well as the nut 9b with which this screw cooperates, is wholly enclosed within the housing 3, and it follows, therefore, that these parts are thoroughly protected from moisture which would cause them to become rusted, and also from dust, dirt, or other foreign subtances.

Although I have herein shown and described only two forms of slack adjusters embodying my invention, it is understood that various changes and modifications may be made therein within the scope of the appended claims without departing from the spirit and scope of my invention.

Having thus described my invention, what I claim is:

1. In a slack adjuster, a housing, means for securing said housing to one of the operating members of the brake rigging of a railway vehicle, a screw rotatably mounted in and protected by said housing and provided on the outside of said housing with means for rotating said screw, and means formed on another member of the brake rigging extending into said housing with a sliding fit and provided on the inside of the housing with a screw threaded portion which cooperates with said screw in such manner that rotation of said screw will vary the effective point of connection of said two operating members.

2. The combination with two of the operating members of the brake rigging of a railway vehicle of a slack adjuster comprising a fulcrum block pivotally connected with the one member, a housing secured at one end to said fulcrum block and provided at the other end with a bearing, a screw rotatably mounted at one end in a bearing formed in said fulcrum block and at the other end in said first mentioned bearing, means for rotating said screw, and a frame formed on the other member extending into said housing past said fulcrum block with a sliding fit and provided on the inside of the housing with an integral nut which cooperates with said screw in such manner that rotation of said screw will vary the effective point of connection of said two operating members.

3. In combination, a first and a second member each forming part of the brake rigging of a railway vehicle, and a slack adjuster associated with said two members for operatively connecting said members, said slack adjuster comprising a housing pivotally connected with the one member and slidably receiving a frame formed on one end of the other member, a nut formed integrally with said frame, and a screw rotatably mounted in and protected by said housing and cooperating with said housing and said nut for varying the position of said other member with respect to said housing to vary the effective point of connection of said two members.

4. In a brake slack adjuster, a fulcrum block, an elongated housing secured at one end to said fulcrum block and provided in its opposite end with a bearing which aligns with a bearing formed in the inner end of said fulcrum block, a screw rotatably mounted in said two bearings and having a threaded portion on the outside of the housing at the end which is journaled in said first mentioned bearing, a nut screwed onto the portion of said screw which is located outside of the housing and locked in place, a shoulder on said screw adjacent said first mentioned bearing on the inside of said housing, a thrust washer disposed on said screw between said shoulder and said first mentioned bearing, and a frame having two arms which extend into said housing past said fulcrum block with a sliding fit and an integral nut which cooperates with said screw in such manner that rotation of said screw will move said frame to different longitudinal positions relative to said housing.

5. A slack adjuster for connection between a brake beam and a brake rod comprising a fulcrum block provided with spaced lugs which straddle said brake beam and are provided with openings which align with an opening in said brake beam, a pin disposed in said openings and pivotally connecting said fulcrum block with said brake beam, a housing secured at one end to said fulcrum block at the end opposite to said lugs and provided at its free end with a bearing which aligns with a bearing formed in said fulcrum block, a screw rotatably mounted in said bearings and having means secured thereto on the outside of said housing for rotating said screw, and a frame secured to said brake rod and having two spaced arms which extend into said housing on opposite sides of the spaced lugs of said fulcrum block with a sliding fit and having an integral nut which cooperates with said screw in such manner that rotation of said screw will move said frame to different longitudinal positions in said housing.

6. A slack adjuster for connection between a bifurcated brake lever and a brake rod comprising a fulcrum block disposed between the bifurcations of said brake lever and pinned thereto, a housing secured at one end to one end of said fulcrum block and provided at its free end with a bearing which aligns with a bearing formed in said fulcrum block, a screw rotatably mounted in said bearings and having means secured thereto on the outside of said housing for rotating said screw, and a frame secured to said brake rod and having two spaced arms which extend into said housing on opposite sides of said fulcrum block with a sliding fit and having an integral nut which cooperates with said screw in such manner that rotation of said screw will move said frame to different longitudinal positions in said housing.

EMIL G. MUELLER.